US012747787B2

(12) United States Patent
Gandhi et al.

(10) Patent No.: US 12,747,787 B2
(45) Date of Patent: Sep. 29, 2026

(54) CONTROLLING AN ELECTRICALLY CONTROLLABLE RELEASE BOLT OF A PARKING BRAKE ACTUATOR

(71) Applicant: VOLVO TRUCK CORPORATION, Gothenburg (SE)

(72) Inventors: Rohit Gandhi, Pune Maharashtra (IN); Vinay Talanki K S, Bangalore Karnataka (IN); Sachin Umesh, Bangalore Karnataka (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 19/189,694

(22) Filed: Apr. 25, 2025

(65) Prior Publication Data

US 2025/0334178 A1 Oct. 30, 2025

(30) Foreign Application Priority Data

Apr. 26, 2024 (EP) .................................... 24172622

(51) Int. Cl.
*F16H 63/34* (2006.01)

(52) U.S. Cl.
CPC ..... *F16H 63/3466* (2013.01); *F16H 63/3491* (2013.01)

(58) Field of Classification Search
CPC ......................... F16H 63/3466; F16H 63/3491
See application file for complete search history.

(56) References Cited

U.S. PATENT DOCUMENTS 7,559,413 B2 7/2009 Haffelder et al.
2010/0078274 A1 4/2010 Christopher Jackson et al.
2014/0345995 A1* 11/2014 Hively .................. B60T 17/088 188/361
2017/0334411 A1* 11/2017 Kitano .................... F16D 59/02
2019/0176790 A1* 6/2019 Urano ................... B60T 13/662
(Continued)

FOREIGN PATENT DOCUMENTS

EP 3059131 A1 8/2016

OTHER PUBLICATIONS

Extended European Search Report in corresponding European Application No. 24172622.3 dated Dec. 6, 2024 (6 pages).
(Continued)

*Primary Examiner* — Hussein Elchanti
(74) *Attorney, Agent, or Firm* — Jeffri A. Kaminski; Venable LLP

(57) ABSTRACT

A computer system has processing circuitry to control an electrically controllable release bolt of a parking brake actuator of a vehicle is provided. The electrically controllable release bolt adjusts a compression of a parking brake spring of the parking brake actuator. The processing circuitry is configured to determine an activation state for the electrically controllable release bolt based on a pressure status of an air-pressure supply of the parking brake actuator and/or based on a input. When the electrically controllable release bolt is active and in response to detecting a parking brake request or parking brake release request, the processing circuitry is configured to control or to adjust the electrically controllable release bolt to adjust a compression of the parking brake spring based on the detected parking brake request or parking brake release request.

15 Claims, 5 Drawing Sheets

(56) References Cited

U.S. PATENT DOCUMENTS

| | | | | |
|---|---|---|---|---|
| 2019/0263372 | A1* | 8/2019 | Normyle | B60T 15/041 |
| 2021/0237702 | A1* | 8/2021 | Beier | B60T 13/36 |
| 2021/0380078 | A1* | 12/2021 | Plow | F16H 61/0059 |
| 2022/0251876 | A1* | 8/2022 | Pizzato | E05B 47/0001 |
| 2023/0145675 | A1* | 5/2023 | Johannes | B60D 1/62<br>280/420 |
| 2023/0182709 | A1* | 6/2023 | Sun | B60T 13/683<br>303/9.66 |
| 2023/0211757 | A1* | 7/2023 | Allen | B60T 7/20<br>188/5 |
| 2025/0061759 | A1* | 2/2025 | Pasma | G07C 9/00571 |

OTHER PUBLICATIONS

European Communication pursuant to Article 94(3) EPC dated Jun. 22, 2026 in corresponding European Patent Application No. 24172622.3, 6 pages.

* cited by examiner

CONTROLLING AN ELECTRICALLY CONTROLLABLE RELEASE BOLT OF A PARKING BRAKE ACTUATOR

TECHNICAL FIELD

The disclosure relates generally to parking brakes. In particular aspects, the disclosure relates to controlling an electrically controllable release bolt of a parking brake actuator. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Trucks and buses in parked condition require air pressure in the parking brake system to remove a parking brake, i.e., to use air pressure to compress a parking spring in a parking brake actuator. If no air pressure is present in the system due to rupture in an air pressure source line a release bolt is typically used which is unscrewed manually in a parking brake actuator to manually compress the parking spring. For this process, a driver has to go under the body & release the bolt of each parking brake actuator, which is time consuming and thereby reduced productivity, and it is potentially dangerous if the vehicle starts rolling.

Hence, there is a strive to improve efficiency and safety when managing parking brakes.

SUMMARY

According to a first aspect of the disclosure, a computer system comprising processing circuitry configured to control an electrically controllable release bolt of a parking brake actuator of a vehicle is provided. The electrically controllable release bolt is arranged to adjust a compression state of a parking brake spring of the parking brake actuator. A resulting brake force applied by the parking brake actuator to a wheel of the vehicle is based on said compression state. The processing circuitry is configured to determine an activation state for the electrically controllable release bolt based on a pressure status of an air-pressure supply of the parking brake actuator and/or based on an input. When the activation state indicates that the electrically controllable release bolt is active and in response to detecting a parking brake request or parking brake release request, the processing circuitry is configured to control the electrically controllable release bolt to adjust the compression state of the parking brake spring based on the detected parking brake request or parking brake release request.

The first aspect of the disclosure may seek to improve efficiency and safety when handling parking brakes due to a current need of manually handling release bolts.

A technical benefit may include improved efficiency and safety when handling parking brakes, this is since the when the activation state indicates that the electrically controllable release bolt is active, the electrically controllable release bolt adjusts the compression state of the parking brake spring based on the detected parking brake request or parking brake release request. This means that there is no need for a driver to ever get out to manually release the parking brake spring as the compression state of the parking brake spring can be controlled using the electrically controllable release bolt.

Optionally in some examples, including in at least one preferred example, the processing circuitry is configured to obtain an indication of a motion of the vehicle, and based on the motion of the vehicle, detect whether a predefined hazard condition is fulfilled. The indication of the motion may be obtained from sensors of the vehicle. When the activation state indicates that the electrically controllable release bolt is active, and in response to detecting that the predefined hazard condition is fulfilled, the processing circuitry is configured to control the electrically controllable release bolt to release a pressure applied to the parking brake spring.

A technical benefit may include improved safety when handling parking brakes. This is since if there is a hazard, the parking brake can immediately be active by releasing the pressure applied to the parking brake spring.

Optionally in some examples, including in at least one preferred example, detecting that the predefined hazard condition is fulfilled further comprises detecting that the electrically controllable release bolt is currently being controlled to compress the parking brake spring, or detecting that a time elapsed since a latest actuated parking brake release request by the parking brake actuator is below a time threshold.

A technical benefit may include improved efficiency and safety when handling parking brakes. This is since if the parking brake has recently been released or is currently being released by compressing the parking brake spring and the vehicle starts to move, then the parking brake can be immediately actuated by releasing the pressure applied to the parking brake spring.

Optionally in some examples, including in at least one preferred example, detecting that the predefined hazard condition is fulfilled further comprises detecting that a speed or acceleration of the wheel and/or a speed or acceleration of the vehicle is outside a predefined safety interval.

A technical benefit may include improved safety when handling parking brakes. This is since it may be more accurately detected when there is a hazard which demands actuation of the parking brake.

Optionally in some examples, including in at least one preferred example, detecting that the predefined hazard condition is fulfilled further comprises detecting that a speed or acceleration of the wheel and/or a speed or acceleration of the vehicle is non-zero.

A technical benefit may include improved safety when handling parking brakes. This is since it may be more accurately detected when there is a hazard which demands actuation of the parking brake, in particular, a careful approach may be taken which again actuates the parking brake if any motion is detected.

Optionally in some examples, including in at least one preferred example, controlling the electrically controllable release bolt based on the detected parking brake request comprises controlling the electrically controllable release bolt to release the parking brake spring; and controlling the electrically controllable release bolt based on the detected parking brake release request comprises controlling the electrically controllable release bolt to compress the parking brake spring.

A technical benefit may include improved efficiency and safety when handling parking brakes. This is since there is no need to control the parking brake using manual release bolts, and furthermore, the electrically controllable release bolt can be used in any suitable situation to control the parking brake spring compression, instead of, or in addition to the air supply in the parking brake actuator.

Optionally in some examples, including in at least one preferred example, controlling the electrically controllable release bolt comprises controlling an electrical motor of the parking brake actuator to drive the electrically controllable release bolt in a direction towards or from the parking brake spring based on the detected parking brake request or parking brake release request.

A technical benefit may include improved efficiency and safety when handling parking brakes. This is since the electrical motor can efficiently and rapidly control the electrically controllable release bolt to compress or release the parking brake spring.

Optionally in some examples, including in at least one preferred example, the activation state for the electrically controllable release bolt is determined to be active when the input is indicative of the vehicle being towed.

A technical benefit may include improved efficiency and safety when handling parking brakes. This is since the vehicle, when towed, can utilize the electrically controllable release bolt to brake the vehicle when needed, or to release the parking brakes, without having to have air supply in the parking brake actuator.

Optionally in some examples, including in at least one preferred example, the activation state for the electrically controllable release bolt is determined to be active when the pressure status of an air-pressure supply indicates that the air pressure supplied to the parking brake actuator is below a pressure threshold.

A technical benefit may include improved efficiency and safety when handling parking brakes. This is since when there is no or little air pressure supplied to the parking brake actuator, the parking brake spring may not be able to be compressed and thereby it may be difficult to handle the parking brake and manual release using a manual release bolt may be needed. Instead, when activating the electrically controllable release bolt, the electrically controllable release bolt can release, or actuate, the parking brake by releasing or compressing the parking brake spring.

According to a second aspect of the disclosure, a parking brake actuator comprising an electrically controllable release bolt and a parking brake spring is provided. The electrically controllable release bolt is arranged to adjust a compression state of the parking brake spring of the parking brake actuator. The parking brake actuator is arranged to be controlled by the computer system according to the first aspect. The second aspect of the disclosure solves the same or corresponding problems as the first aspect. Technical benefits of the first aspect apply to the second aspect and vice versa. Optionally in some examples, including in at least one preferred example, the electrically controllable release bolt is a power screw arranged to be controlled by an electrical motor.

According to a third aspect of the disclosure, a vehicle comprising the parking brake actuator according to the second aspect is provided. Optionally in some examples, including in at least one preferred example, the vehicle comprises the computer system according to the first aspect.

The third aspect of the disclosure solves the same or corresponding problems as the first aspect. Technical benefits of the first aspect apply to the third aspect and vice versa.

According to a fourth aspect of the disclosure, a computer-implemented method for controlling an electrically controllable release bolt of a parking brake actuator of a vehicle is provided. The electrically controllable release bolt is arranged to adjust a compression state of a parking brake spring of the parking brake actuator. A resulting brake force applied by the parking brake actuator to at least one wheel of the vehicle is based on said compression state.

The method comprises, by a processing circuitry of a computer system, determining an activation state for the electrically controllable release bolt based on a pressure status of an air-pressure supply of the parking brake actuator and/or based on an input. The method comprises, by the processing circuitry, when the activation state indicates that the electrically controllable release bolt is active and in response to detecting a parking brake request or parking brake release request, controlling the electrically controllable release bolt to adjust the compression state of the parking brake spring based on the detected parking brake request or parking brake release request.

Optionally in some examples, including in at least one preferred example, the method comprises, by the processing circuitry, obtaining an indication of a motion of the vehicle, and based on the motion of the vehicle, detecting whether a predefined hazard condition is fulfilled. In these examples, the method may further comprise, by the processing circuitry, when the activation state indicates that the electrically controllable release bolt is active, and in response to detecting that the predefined hazard condition is fulfilled, controlling the electrically controllable release bolt to release a pressure applied to the parking brake spring.

Optionally in some examples, including in at least one preferred example, detecting that the predefined hazard condition is fulfilled further comprises detecting that the electrically controllable release bolt is currently being controlled to compress the parking brake spring, or detecting that a time elapsed since a latest actuated parking brake release request by the parking brake actuator is below a time threshold.

Optionally in some examples, including in at least one preferred example, detecting that the predefined hazard condition is fulfilled further comprises detecting that a speed or acceleration of the wheel and/or a speed or acceleration of the vehicle is outside a predefined safety interval.

Optionally in some examples, including in at least one preferred example, detecting that the predefined hazard condition is fulfilled further comprises detecting that a speed or acceleration of the wheel and/or a speed or acceleration of the vehicle is non-zero.

The fourth aspect of the disclosure solves the same or corresponding problems as the first aspect. Technical benefits of the first aspect apply to the fourth aspect and vice versa. All examples of the first aspect apply, in a corresponding manner, to the fourth aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
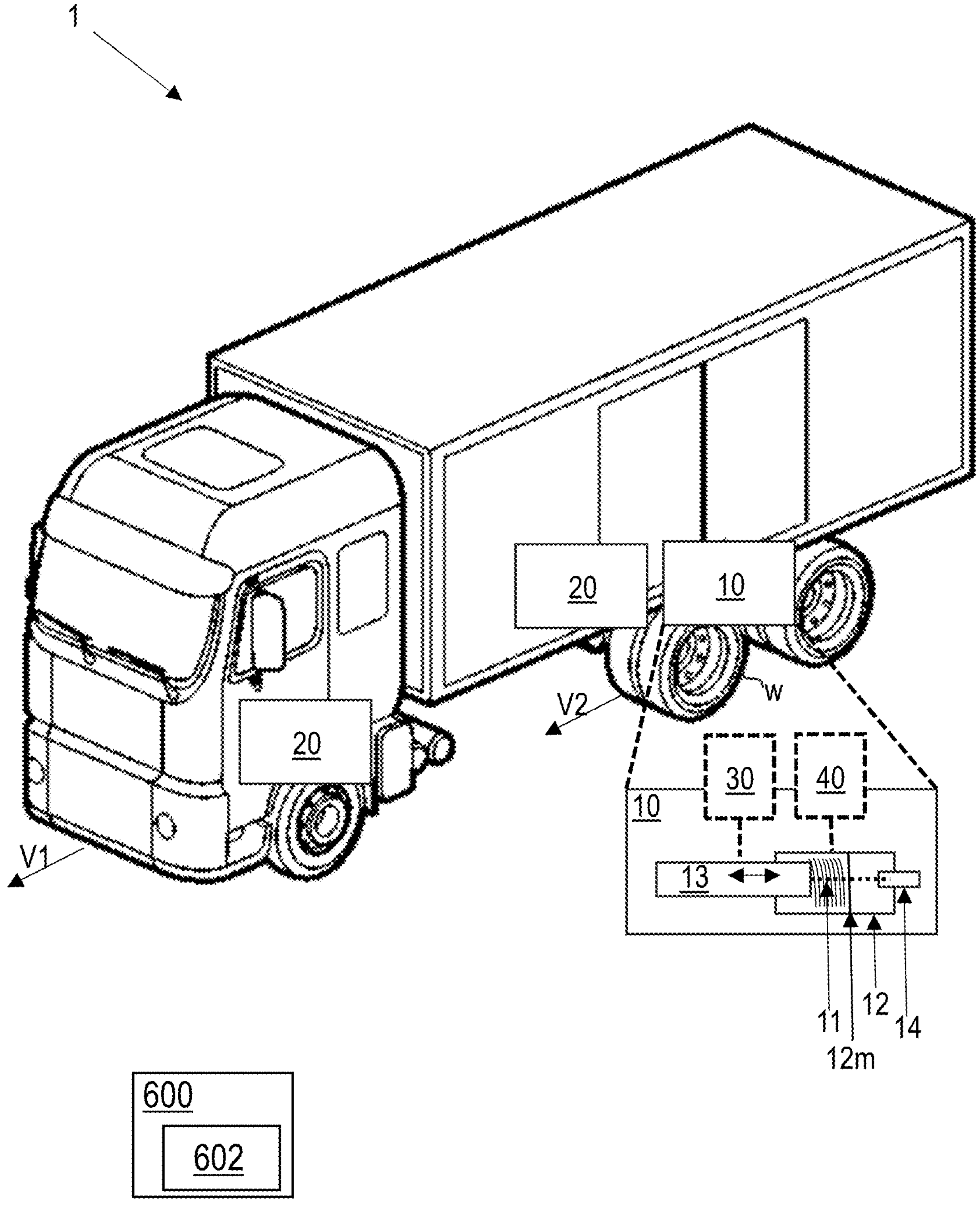
FIG. 1 is an exemplary illustration of a vehicle and a parking brake actuator according to an example.

FIG. 1 is an exemplary illustration of a vehicle 1 and a parking brake actuator 10 comprised therein, according to an example.

The vehicle 1 may be any suitable vehicle, such as a truck, bus, or heavy-duty vehicle.

In some examples herein, the vehicle 1 is towed by another vehicle, wherein the parking brake actuator 10 may be arranged to be used as an extra brake functionality of the vehicle 1 while being towed.

In some examples herein, the vehicle 1 is not towed by another vehicle.

The vehicle 1 may comprise a wheel w. The parking brake actuator 10 may be a parking brake actuator for the wheel w. Typically the parking brake actuator 10 is per wheel, i.e., for a single wheel, but it may also be possible to couple the actuator to all wheels of the vehicle 1.

The parking brake actuator 10 comprises an electrically controllable release bolt 13 and a parking brake spring 11. Typically, the parking brake spring 11 and/or the electrically controllable release bolt 13 is mechanically connected to a push rod 14, such that when the parking brake spring 11 and/or the electrically controllable release bolt 13 moves, then the push rod 14 is moved accordingly. The push rod 14 may then brake the wheel w, e.g., by activating a brake of the wheel, e.g., by actuating a camshaft which will activate a suitable brake of the wheel w.

The electrically controllable release bolt 13 is arranged to control or adjust a compression state of a parking brake spring 11 of the parking brake actuator 10. A resulting brake force applied by the parking brake actuator 10 to a wheel w of the vehicle 1 is based on said compression state. This is since the push rod 14 may be moved based on the compression state and thereby brake the wheel w.

The electrically controllable release bolt 13 may be a power screw or any suitable entity which may be electrically controlled to control or to adjust a compression state of the parking brake spring 11.

The electrically controllable release bolt 13 may be similar to a standard release bolt used for manual release of the parking brake spring 11, but in examples herein, it is electrically controlled such that no manual effort is needed, and may instead be directly controlled based on brake requests or brake release requests from the vehicle 1 or from a user or driver of the vehicle 1.

The parking brake spring 11 may typically be separated in the parking brake actuator from a first chamber 12 similar or same as any other suitable parking brake. The first chamber 12 may be expandable and may change in size based on amount of air filling the first chamber 12. The first chamber 12 may typically be expandable by a first membrane **12*m* separating the air of the first chamber 12 with the parking brake spring 11. While the first membrane 12*m* is illustrated as a line in FIG. 1, the first membrane 12*m* may be any suitable membrane or other divisor, e.g., and may be fixed and/or may be arranged to flexibly expand due to air pressure supplied in the first chamber 12. The first chamber 12 may thus interact with the parking brake spring 11 such that when the first chamber 12 is filled with air, the parking brake spring 11 is compressed, and when the air is released from the first chamber 12, the parking brake spring 11 is released to extend. The first chamber 12 may be filled by an air-pressure supply 40**.

In examples herein, the air-pressure supply 40 may not work properly, or may be associated with a too low air pressure to compress the parking brake spring 11, instead, the electrically controllable release bolt 13 may be used to compress and extend the parking brake spring 11. The electrically controllable release bolt 13 may be connected to the first chamber 12 and may be arranged to expand or deflate the first chamber 12 to adjust the compression state of the parking brake spring 11.

In examples herein the electrically controllable release bolt 13 may be active and/or controlled based on a motion of the vehicle 1 and/or the wheel w. To detect a first motion V1 of the vehicle 1, or to detect a second motion of the wheel w, a set of sensors 20 may be comprised in the vehicle 1 which may comprise any suitable sensors for detecting a motion of the vehicle 1 and/or the wheel w, e.g., a speedometer and/or a wheel speed sensor.

In examples herein the electrically controllable release bolt 13 may be controlled by an electrical motor 30. The motor 30 may be mounted on the parking brake actuator 10.

The motor 30 may be powered by an independent power system, e.g., a battery separate from other vehicle functionalities, e.g., such that the electrically controllable release bolt 13 may be controlled while the vehicle 1 is otherwise idle with its engine or other systems turned off.

It should be noted that, while not illustrated in FIG. 1, the parking brake actuator 10 may be, as is well-known in industry, also an actuator for service brakes and/or may be co-located with a service brake actuator such that the push rod 14 may interact with a parking brake spring, a service brake spring, and their separate air-chambers, which will be briefly discussed in FIGS. **2*a-c***.

Examples herein may be performed by a computer system 600 and/or a processing circuitry 602 therein. The computer system 600 and/or the processing circuitry 602 may be comprised in the vehicle 1 or may be remote to the vehicle 1, e.g., as part of a server or cloud service. The computer system 600 and/or the processing circuitry 602 therein may be, or may be part of an Electronic Control Unit (ECU), such as a brake ECU.

The computer system 600 and/or the processing circuitry 602 therein may be capable of controlling any suitable entity of the vehicle 1 and/or the parking brake actuator 10, e.g., the electrical motor 30, the air-pressure supply 40, the set of sensors 20, the electrically controllable release bolt 13, or a combination thereof.

FIGS. **2*a-c* are exemplary illustrations of the parking brake actuator 10** according to some examples.

FIG. **2*a* illustrates the parking brake actuator 10 when the parking brake spring 11 is compressed. This is since the parking brake spring 11 is pressured by an air-pressure of the first chamber 12, typically by the first membrane 12*m* or by any other means to pressurize the first chamber 11. The electrically controllable release bolt 13 may be inserted into a housing 12*h*. The housing 12*h* may be connected with the push rod 14 and may pass through the first membrane 12*m*. The air-pressure supply 40 may be used to pump air into the first chamber 12 to compress the parking brake spring 11. In the example of FIG. 2***a*, the electrically controllable release bolt 13 may not be active since the air-pressure supply 40 is properly working to compress the parking brake spring 11. Thereby, in this example, the electrical motor 30 is not in use, and accordingly, the electrically controllable release bolt 13 may be inserted into the housing 12*h* when air is present in the first chamber 12. When the motor is activated and when there is no air present in the first chamber 12, the electrically controllable release bolt 13 may be rotated away from the push rod 14 to compress the parking brake spring 11.

Figure 2A:
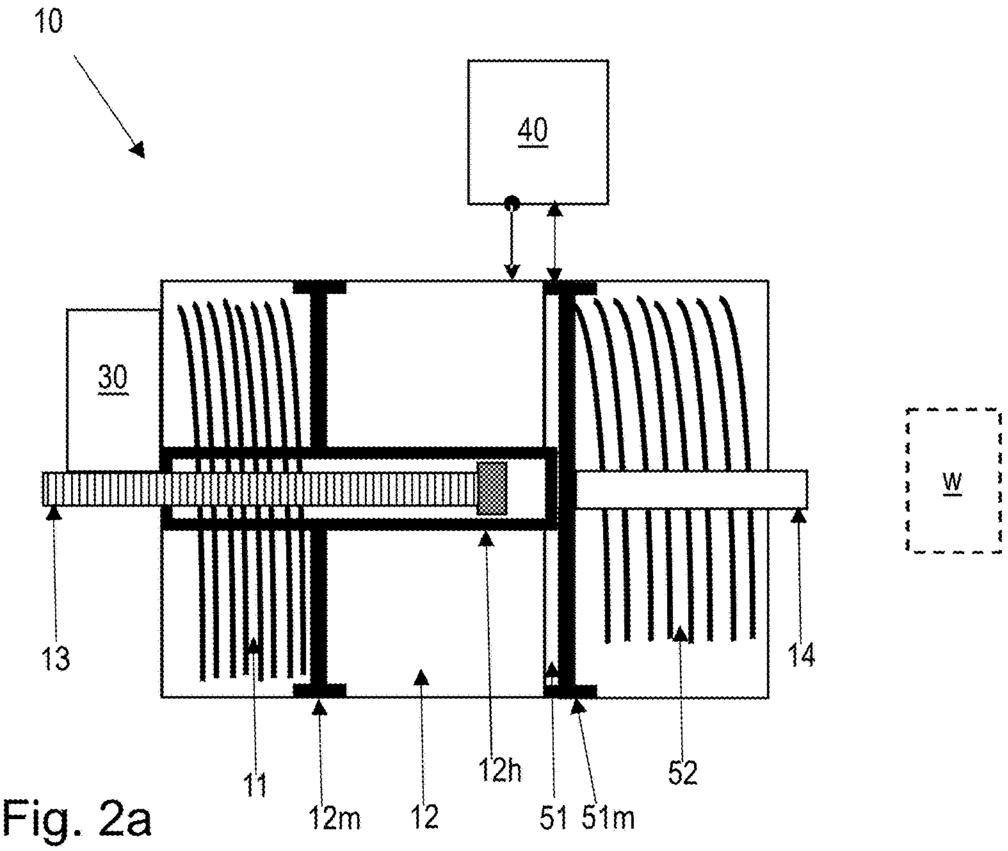
FIGS. 2*a*-*c* are exemplary illustrations of a parking brake actuator according to some examples.

In the example of FIG. 2*a*, the parking brake spring 11 compression state affects the position of the push rod 14, the brakes of the wheel w is not actuated. It may further be seen in FIG. 2*a* that the parking brake actuator 10 may also serve as a service brake actuator in some examples. For example, the parking brake actuator 10 may comprise a service brake spring 52 with a second chamber 51 and a separating second membrane 51*m*. The housing 12*h* may be attached with the second membrane 51*m* such that the position of the second membrane 51*m* may affect the position of the electrically controllable release bolt 13 and/or vice versa. When the service brake is actuated, the second chamber is, in contrast to the parking brake, filled with air which will compress the service brake spring 52, and thereby move the push rod 14 to active braking of the wheel w.

In the example of FIG. 2*a*, air may flow from the air-pressure supply 40 to the first chamber 12 to compress the parking brake spring 11. Air may further flow between the air-pressure supply 40 and the second chamber 51 depending on whether the service brake is actuated or not.

Figure 2B:
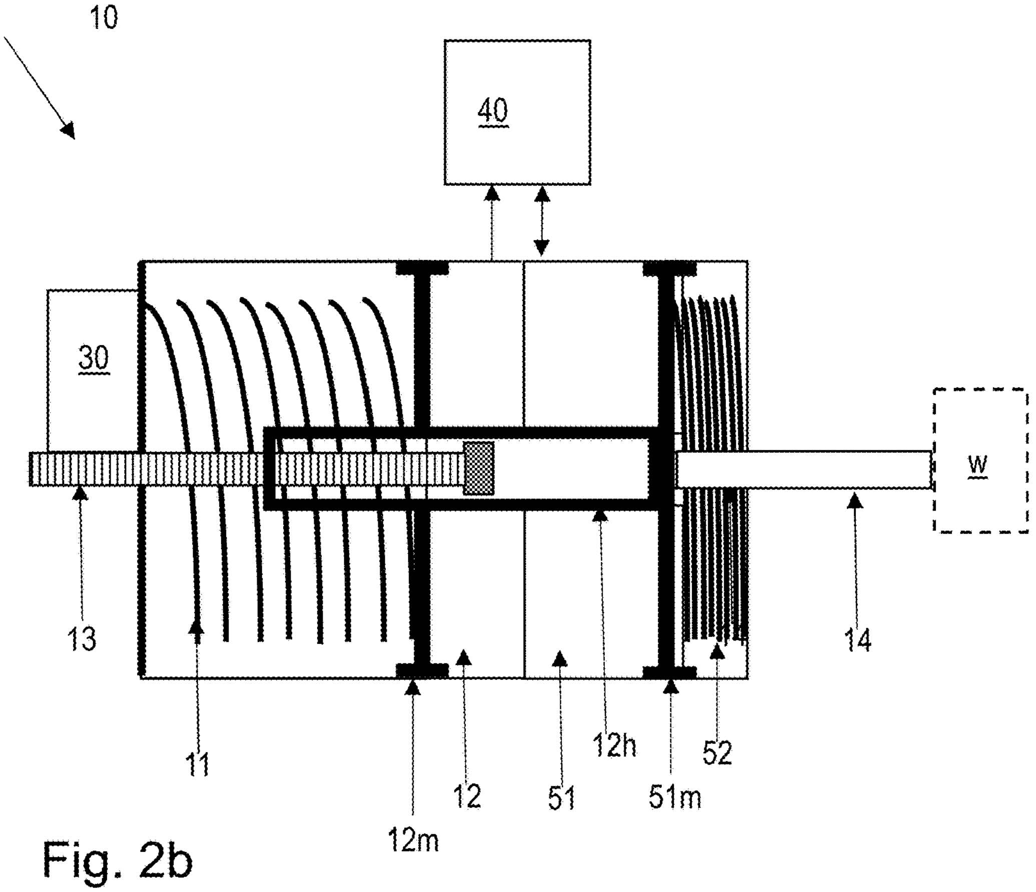

In contrast to FIG. 2*a*, in FIG. 2*b*, the parking brake spring 11 is released by the air in the first chamber 12 being released or by some error leading to no air-pressure in the air-pressure supply 40, e.g., rupture. Accordingly, the push rod 14 is moved due to the pressure supplied by the parking brake spring 11. As further can be seen, the parking brake spring 11 may completely compress the first chamber 12 which may be connected to the push rod 14 such that the push rod 14 is moved to active brakes of the wheel w by any suitable means. In some examples, when there is no air in the air-pressure supply 40 to fill the first chamber 12 to compress the parking brake spring 11, the electrically controllable release bolt 13 may be active to control the parking brake spring 11. The electrically controllable release bolt 13 may be coupled to the push rod directly or indirectly, for example by the electrically controllable release bolt 13 being attached to the parking brake spring 11 or the first membrane 12*m* or the first chamber 12, such that when the electrically controllable release bolt 13 moves, it may directly or indirectly adjust the compression state of the parking brake spring 11 and the position of the push rod 14 such that the braking of the wheel can be controlled by controlling the electrically controllable release bolt 13. Typically this is performed by the electrical motor 30 driving the electrically controllable release bolt 13 to compress or extend the parking brake spring 11.

In the example of FIG. 2*b*, air may not be present in the first chamber 12 and may in some scenarios flow back to the air-pressure supply 40, e.g., to be released to an exhaust. Air may further flow from the air-pressure supply 40 and the second chamber 51 depending on whether the service brake is actuated or not.

Figure 2C:
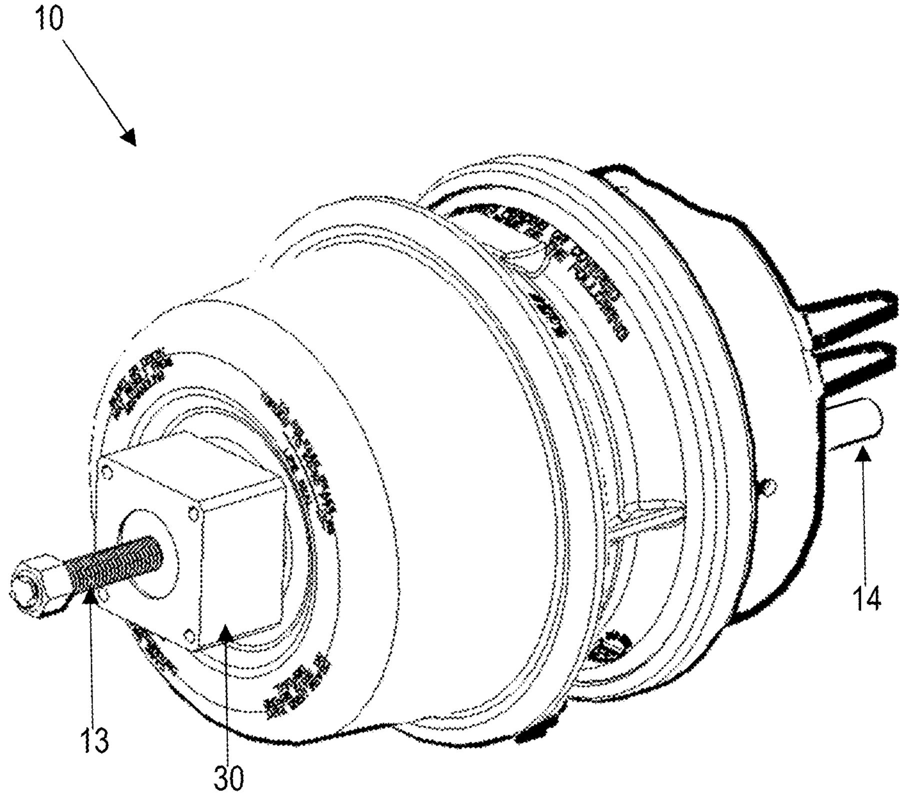

FIG. 2*c* illustrates an exterior of an example parking brake actuator 10, where the electrically controllable release bolt 13 and respective electrical motor 30 are illustrated. The electrically controllable release bolt 13 may be driven into and out of the parking brake actuator 10 to move the push rod 14, by compressing and releasing the parking brake spring 11 comprised in the parking brake actuator 10.

Figure 3:
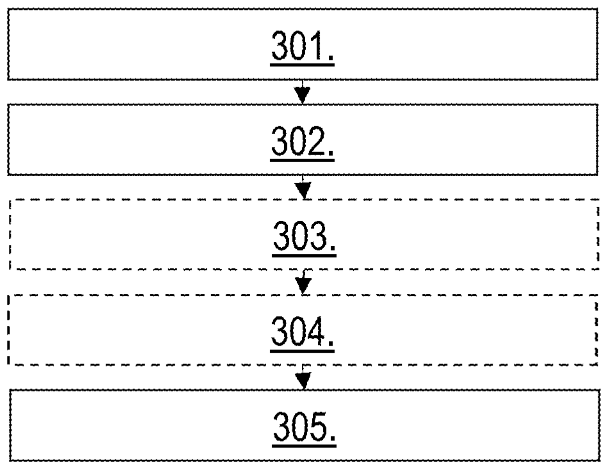
FIG. 3 is a flow chart of a method according to an example

FIG. 3 is a flow chart of a method for controlling the electrically controllable release bolt 13 of the parking brake actuator 10 of the vehicle 1. The electrically controllable release bolt 13 being arranged to adjust a compression state of a parking brake spring 11 of the parking brake actuator 10. A resulting brake force applied by the parking brake actuator 10 to the wheel w of the vehicle 1 is based on said compression state. The method comprises the following actions in any suitable order, e.g., in the order presented below. Optional actions may be indicated in FIG. 3 with dashed boxes. The method and actions may be performed by the computer system 600, the processing circuitry therein, or by any other suitable control unit.

Action 301

The method comprises determining an activation state for the electrically controllable release bolt 13 based on a pressure status of the air-pressure supply 40 of the parking brake actuator 10 and/or based on an input such as a user input. The input may be an input signal, e.g., electric signal, or may be a mechanical switch turning on the functionalities of the electrically controllable release bolt 13, e.g., and powering the electric motor 30.

In other words, determining the activation state may further comprise obtaining the pressure status of the air-pressure supply 40 and/or obtaining the input.

In some examples, the activation state for the electrically controllable release bolt 13 is determined to be active when the input is indicative of the vehicle 1 being towed.

In some examples, the activation state for the electrically controllable release bolt 13 is determined to be active when the pressure status of an air-pressure supply 40 indicates that the air pressure supplied to the parking brake actuator 10 is below a pressure threshold, or indicates that the air-pressure supply 40 is broken, damaged, or turned off. The pressure threshold may be an error margin above zero and/or may relate to a pressure needed to compress the parking brake spring 11, i.e., a pressure relating to a force greater than a spring force of the parking brake spring 11.

Action 302

The method comprises detecting a parking brake request or parking brake release request.

Detecting the parking brake request or the parking brake release request may be performed by obtaining an electronic signal or by mechanical input from a brake arrangement of the vehicle 1, e.g., as a user or driver brakes the parking brakes of the vehicle 1. The parking brake request or parking brake release request may be any suitable requests as for using the parking brake actuator 10 when using the air-pressure supply 40, or may be requests specifically intended for controlling the electrically controllable release bolt 13.

Action 303

The method comprises obtaining an indication of a motion of the vehicle 1. The motion of the vehicle may be a vehicle motion such as vehicle speed, or a motion of the wheel w, e.g., a rolling motion or rotational speed. While some examples are listed, any motion may be obtained as any motion may suggest that the parking brake actuator 10 may need to release the parking brake spring 11 to brake the wheel w, in particular if the vehicle 1 starts to move while compressing the parking brake spring 11 or within a short time period thereafter. The indication of the motion of the vehicle may be obtained from any suitable sensor out of the set of sensors 20, e.g., any of: speedometer, wheel speed sensor, inertial measurement units, accelerometers, or a combination thereof.

Action 304

The method comprises, based on the motion of the vehicle 1, detecting whether a predefined hazard condition is fulfilled. The predefined hazard condition may typically relate to if the vehicle 1 or wheel w is moving, and if the parking brake spring 11 was recently compressed or is currently being actuated to be compressed. In other words, when releasing the parking brake, there may be a hazard if the wheel w starts rolling, in particular if the motion is significant such as above a set rotational speed threshold.

In some examples, detecting that the predefined hazard condition is fulfilled further comprises detecting that the electrically controllable release bolt 13 is currently being controlled to compress the parking brake spring 11, or detecting that a time elapsed since a latest actuated parking brake release request by the parking brake actuator 10 is below a time threshold. If this is the case, then it can be concluded that the vehicle 1 is in a hazard when releasing the parking brake. That the electrically controllable release bolt 13 is currently being controlled to compress the parking brake spring 11 may be detected by detecting control signals applying a release of the parking brake spring 11, or that a brake release request is currently issued to the parking brake actuator 10.

In some examples, detecting that the predefined hazard condition is fulfilled further comprises detecting that a speed or acceleration of the wheel w and/or a speed or acceleration of the vehicle 1 is outside a predefined safety interval.

In some examples, detecting that the predefined hazard condition is fulfilled further comprises detecting that a speed or acceleration of the wheel w and/or a speed or acceleration of the vehicle 1 is non-zero.

Action 305

The method comprises, when the activation state indicates that the electrically controllable release bolt 13 is active and in response to detecting a parking brake request or parking brake release request, e.g., as in action 302, controlling the electrically controllable release bolt 13 to adjust or control the compression state of the parking brake spring 11 based on the detected parking brake request or parking brake release request. As used herein, controlling the compression state may mean adjusting the compression state and vice versa. Accordingly, the parking brake actuation of the wheel w can be actuated by use of the electrically controllable release bolt 13. Controlling the electrically controllable release bolt 13 may comprise applying a current to the electrically controllable release bolt 13 which triggers the electrically controllable release bolt 13 to rotate or move, e.g., unwind.

In examples herein, controlling the electrically controllable release bolt 13 may comprise unwinding the electrically controllable release bolt 13 using the electrical motor 30 in response to detecting a brake release request. Controlling the electrically controllable release bolt 13 may comprise transmitting instructions to a control unit controlling the motor 30 and/or the electrically controllable release bolt 13.

In some examples, controlling the electrically controllable release bolt 13 may further comprise controlling multiple electrically controllable release bolts for multiple wheels of the vehicle 1, in a corresponding manner as in the examples provided herein.

In some examples, when the activation state indicates that the electrically controllable release bolt 13 is active, and in response to detecting that the predefined hazard condition is fulfilled, controlling the electrically controllable release bolt 13 comprises controlling the electrically controllable release bolt 13 to release a pressure applied to the parking brake spring 11.

In some examples, the electrically controllable release bolt 13 may be used for braking and for brake release of the parking brake, i.e., compressing and releasing the parking brake spring 11. In other words, controlling the electrically controllable release bolt 13 based on the detected parking brake request may comprise controlling the electrically controllable release bolt 13 to release the parking brake spring 11. In a corresponding manner, controlling the electrically controllable release bolt 13 based on the detected parking brake release request may comprise controlling the electrically controllable release bolt 13 to compress the parking brake spring 11.

In some examples, controlling the electrically controllable release bolt 13 comprises controlling the electrical motor 30 of the parking brake actuator 10 to drive the electrically controllable release bolt 13 in a direction towards or from the parking brake spring 11 based on the detected parking brake request or parking brake release request.

When being towed, e.g., as indicated by the input of action 301, the vehicle 1 may use the parking brake actuator 10 as a redundant or extra brake system to a brake system of a towing vehicle.

Figure 4:
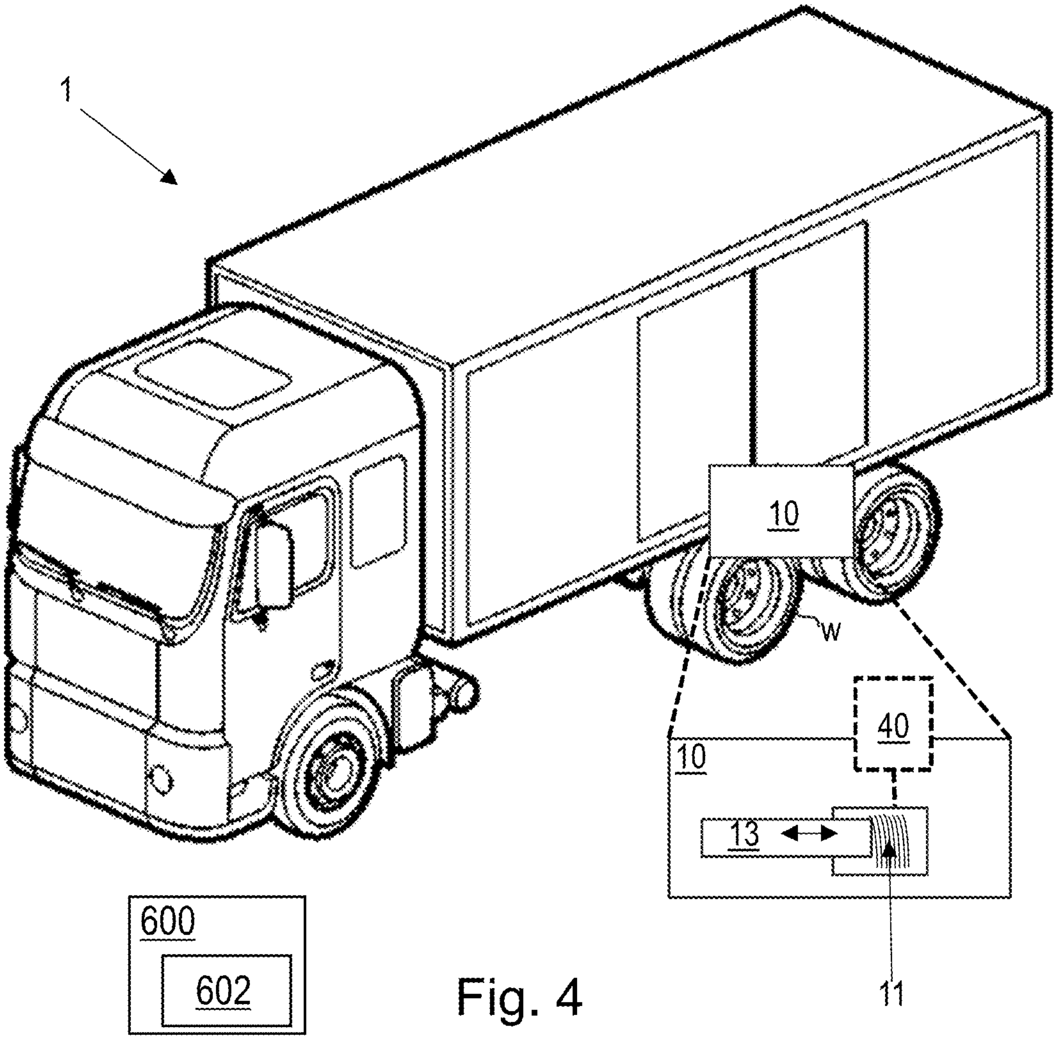
FIG. 4 is another view of FIG. 1, according to an example.

FIG. 4 is another view of FIG. 1, according to an example.

The computer system 600 comprising the processing circuitry 602 configured to control the electrically controllable release bolt 13 of the parking brake actuator 10 of the vehicle 1 is provided. The electrically controllable release bolt 13 is arranged to adjust a compression state of the parking brake spring 11 of the parking brake actuator 10. A resulting brake force applied by the parking brake actuator 10 to the wheel w of the vehicle 1 is based on said compression state.

The processing circuitry 602 is configured to determine an activation state for the electrically controllable release bolt 13 based on a pressure status of the air-pressure supply 40 of the parking brake actuator 10 and/or based on a input.

The processing circuitry 602 is configured to, when the activation state indicates that the electrically controllable release bolt 13 is active and in response to detecting a parking brake request or parking brake release request, control the electrically controllable release bolt 13 to adjust the compression state of the parking brake spring 11 based on the detected parking brake request or parking brake release request.

Figure 5:
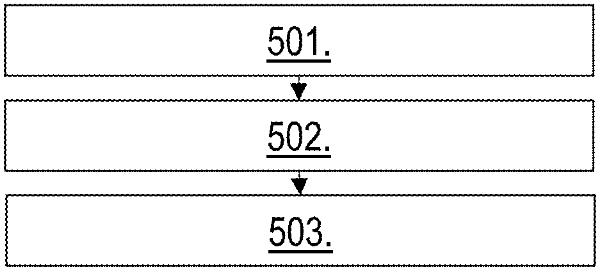
FIG. 5 is a flow chart of an exemplary method according to an example.

FIG. 5 is a flow chart of an exemplary method according to an example. The below actions 501-503 may be combined with the above actions 301-305 in any suitable manner.

A computer-implemented method for controlling the electrically controllable release bolt 13 of the parking brake actuator 10 of the vehicle 1 is provided. The electrically controllable release bolt 13 is arranged to adjust a compression state of the parking brake spring 11 of the parking brake actuator 10. A resulting brake force applied by the parking brake actuator 10 to the wheel w of the vehicle 1 is based on said compression state.

Action 501

The method comprises, by the processing circuitry 602 of the computer system 600, determining an activation state for the electrically controllable release bolt 13 based on a pressure status of the air-pressure supply 40 of the parking brake actuator 10 and/or based on a input.

Action 502

The method comprises, by the processing circuitry 602, detecting a parking brake request or parking brake release request.

Action 503

The method comprises, by the processing circuitry 602, when the activation state indicates that the electrically controllable release bolt 13 is active and in response to detecting a parking brake request or parking brake release request, controlling the electrically controllable release bolt 13 to adjust the compression state of the parking brake spring 11 based on the detected parking brake request or parking brake release request.

Figure 6:
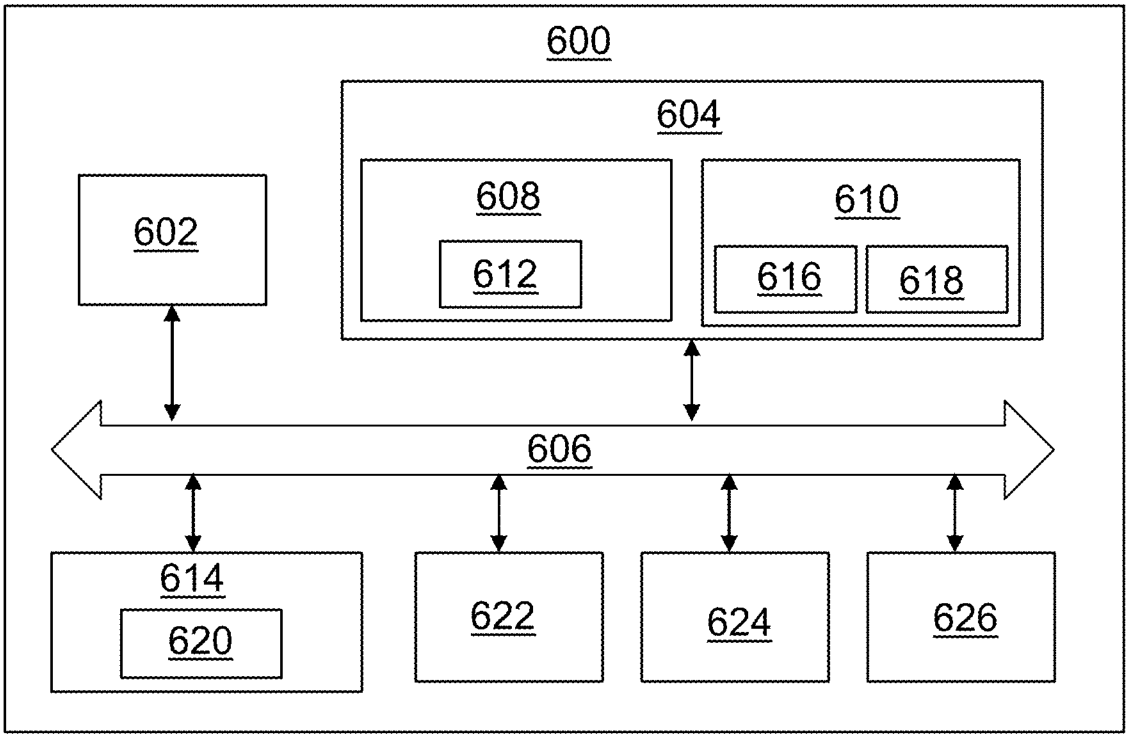
FIG. 6 is a schematic diagram of an exemplary computer system for implementing examples disclosed herein, according to an example.

FIG. 6 is a schematic diagram of a computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include processing circuitry 602 (e.g., processing circuitry including one or more processor devices or control units), a memory 604, and a system bus 606. The computer system 600 may include at least one computing device having the processing circuitry 602. The system bus 606 provides an interface for system components including, but not limited to, the memory 604 and the processing circuitry 602. The processing circuitry 602 may include any number of hardware components for conducting data or signal processing or for executing computer code stored in memory 604. The processing circuitry 602 may, for example, include a general-purpose processor, an application specific processor, a Digital Signal Processor (DSP), an Application Specific Integrated Circuit (A SIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 602 may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processing circuitry 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with processing circuitry 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program 620 stored on a transitory or non-transitory computer-usable or computer-readable storage medium (e.g., single medium or multiple media), such as the storage device 614, which includes complex programming instructions (e.g., complex computer-readable program code) to cause the processing circuitry 602 to carry out actions described herein. Thus, the computer-readable program code of the computer program 620 can comprise software instructions for implementing the functionality of the examples described herein when executed by the processing circuitry 602. In some examples, the storage device 614 may be a computer program product (e.g., readable storage medium) storing the computer program 620 thereon, where at least a portion of a computer program 620 may be loadable (e.g., into a processor) for implementing the functionality of the examples described herein when executed by the processing circuitry 602. The processing circuitry 602 may serve as a controller or control system for the computer system 600 that is to implement the functionality described herein.

The computer system 600 may include an input device interface 622 configured to receive input and selections to be communicated to the computer system 600 when executing instructions, such as from a keyboard, mouse, touch-sensitive surface, etc. Such input devices may be connected to the processing circuitry 602 through the input device interface 622 coupled to the system bus 606 but can be connected through other interfaces, such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may include a communications interface 626 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Below follows a number of Examples which may be combined with any of the examples above or with the below claims in any suitable manner.

1. A computer system 600 comprising processing circuitry 602 configured to control an electrically controllable release bolt 13 of a parking brake actuator 10 of a vehicle 1, the electrically controllable release bolt 13 being arranged to adjust a compression state of a parking brake spring 11 of the parking brake actuator 10, wherein a resulting brake force applied by the parking brake actuator 10 to a wheel w of the vehicle 1 is based on said compression state, the processing circuitry 602 is configured to:
   determine an activation state for the electrically controllable release bolt 13 based on a pressure status of an air-pressure supply 40 of the parking brake actuator 10 and/or based on a input, and
   when the activation state indicates that the electrically controllable release bolt 13 is active and in response to detecting a parking brake request or parking brake release request, control the electrically controllable release bolt 13 to adjust the compression state of the parking brake spring 11 based on the detected parking brake request or parking brake release request.
2. The computer system 600 of Example 1, wherein the processing circuitry 602 is configured to:
   obtain an indication of a motion of the vehicle 1, and based on the motion of the vehicle 1, detect whether a predefined hazard condition is fulfilled, and
   when the activation state indicates that the electrically controllable release bolt 13 is active, and in response to detecting that the predefined hazard condition is fulfilled, control the electrically controllable release bolt 13 to release a pressure applied to the parking brake spring 11.
3. The computer system 600 of Example 2, wherein detecting that the predefined hazard condition is fulfilled further comprises detecting that the electrically controllable release bolt 13 is currently being controlled to compress the parking brake spring 11, or detecting that a time elapsed since a latest actuated parking brake release request by the parking brake actuator 10 is below a time threshold.
4. The computer system 600 of any of Examples 2-3, wherein detecting that the predefined hazard condition is fulfilled further comprises detecting that a speed or acceleration of the wheel w and/or a speed or acceleration of the vehicle 1 is outside a predefined safety interval.
5. The computer system 600 of Examples 4, wherein detecting that the predefined hazard condition is fulfilled further comprises detecting that a speed or acceleration of the wheel w and/or a speed or acceleration of the vehicle 1 is non-zero.
6. The computer system 600 of any of Examples 1-5, wherein controlling the electrically controllable release bolt 13 based on the detected parking brake request comprises controlling the electrically controllable release bolt 13 to release the parking brake spring 11, and wherein controlling the electrically controllable release bolt 13 based on the detected parking brake release request comprises controlling the electrically controllable release bolt 13 to compress the parking brake spring 11.
7. The computer system 600 of any of Examples 1-6, wherein controlling the electrically controllable release bolt 13 comprises controlling an electrical motor 30 of the parking brake actuator 10 to drive the electrically controllable release bolt 13 in a direction towards or from the parking brake spring 11 based on the detected parking brake request or parking brake release request.
8. The computer system 600 of any of Examples 1-7, wherein the activation state for the electrically controllable release bolt 13 is determined to be active when the input is indicative of the vehicle 1 being towed.
9. The computer system 600 of any of Examples 1-8, wherein the activation state for the electrically controllable release bolt 13 is determined to be active when the pressure status of an air-pressure supply 40 indicates that the air pressure supplied to the parking brake actuator 10 is below a pressure threshold.
10. A parking brake actuator 10 comprising an electrically controllable release bolt 13 and the parking brake spring 11, the electrically controllable release bolt 13 being arranged to control or to adjust a compression state of the parking brake spring 11 of the parking brake actuator 10, and wherein the parking brake actuator 10 is arranged to be controlled by the computer system 600 according to any of Examples 1-9.
11. The parking brake actuator 10 of Example 10, wherein the electrically controllable release bolt 13 is a power screw controlled by an electrical motor 30.
12. A vehicle 1 comprising the parking brake actuator 10 according to Example 10 or 11.
13. The vehicle 1 according to Example 12, further comprising the computer system 600 according to any of Examples 1-9.
14. A computer-implemented method for controlling an electrically controllable release bolt 13 of a parking brake actuator 10 of a vehicle 1, the electrically controllable release bolt 13 being arranged to adjust a compression state of a parking brake spring 11 of the parking brake actuator 10, wherein a resulting brake force applied by the parking brake actuator 10 to a wheel w of the vehicle 1 is based on said compression state, the method further comprising:

by a processing circuitry 602 of a computer system 600, determining 301, 501 an activation state for the electrically controllable release bolt 13 based on a pressure status of an air-pressure supply 40 of the parking brake actuator 10 and/or based on a input, and by the processing circuitry 602, when the activation state indicates that the electrically controllable release bolt 13 is active and in response to detecting 302, 502 a parking brake request or parking brake release request, controlling 305, 503 the electrically controllable release bolt 13 to adjust the compression state of the parking brake spring 11 based on the detected parking brake request or parking brake release request.

15. The method of Example 14 further comprising:

by the processing circuitry 602, obtaining 303 an indication of a motion of the vehicle 1, and based on the motion of the vehicle 1, detecting 304 whether a predefined hazard condition is fulfilled, and by the processing circuitry 602, when the activation state indicates that the electrically controllable release bolt 13 is active, and in response to detecting that the predefined hazard condition is fulfilled, controlling 305 the electrically controllable release bolt 13 to release a pressure applied to the parking brake spring 11.

16. The method of Example 15, wherein detecting 304 that the predefined hazard condition is fulfilled further comprises detecting that the electrically controllable release bolt 13 is currently being controlled to compress the parking brake spring 11, or detecting that a time elapsed since a latest actuated parking brake release request by the parking brake actuator 10 is below a time threshold.

17. The method of any of Examples 15-16, wherein detecting 304 that the predefined hazard condition is fulfilled further comprises detecting that a speed or acceleration of the wheel w and/or a speed or acceleration of the vehicle 1 is outside a predefined safety interval.

18. The method of Example 17, wherein detecting 304 that the predefined hazard condition is fulfilled further comprises detecting that a speed or acceleration of the wheel w and/or a speed or acceleration of the vehicle 1 is non-zero.

19. A computer program product comprising program code for performing, when executed by the processing circuitry 602, the method of any of Examples 14-18.

20. A non-transitory computer-readable storage medium comprising instructions, which when executed by the processing circuitry 602, cause the processing circuitry 602 to perform the method of any of Examples 14-18.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to control an electrically controllable release bolt of a parking brake actuator of a vehicle, the electrically controllable release bolt being arranged to adjust a compression state of a parking brake spring of the parking brake actuator, wherein a resulting brake force applied by the parking brake actuator to a wheel of the vehicle is based on said compression state, the processing circuitry is configured to:

determine an activation state for the electrically controllable release bolt based on a pressure status of an air-pressure supply of the parking brake actuator and/or based on an input, and when the activation state indicates that the electrically controllable release bolt is active and in response to detecting a parking brake request or parking brake release request, control the electrically controllable release bolt to adjust the compression state of the parking brake spring based on the detected parking brake request or parking brake release request.

2. The computer system of claim 1, wherein the processing circuitry is configured to:

obtain an indication of a motion of the vehicle, and based on the motion of the vehicle, detect whether a predefined hazard condition is fulfilled, and when the activation state indicates that the electrically controllable release bolt is active, and in response to detecting that the predefined hazard condition is fulfilled, control the electrically controllable release bolt to release a pressure applied to the parking brake spring.

3. The computer system of claim 2, wherein detecting that the predefined hazard condition is fulfilled further comprises detecting that the electrically controllable release bolt is currently being controlled to compress the parking brake spring, or detecting that a time elapsed since a latest actuated parking brake release request by the parking brake actuator is below a time threshold.

4. The computer system of claim 2, wherein detecting that the predefined hazard condition is fulfilled further comprises detecting that a speed or acceleration of the wheel and/or a speed or acceleration of the vehicle is outside a predefined safety interval.

5. The computer system of claim 4, wherein detecting that the predefined hazard condition is fulfilled further comprises detecting that a speed or acceleration of the wheel and/or a speed or acceleration of the vehicle is non-zero.

6. The computer system of claim 1, wherein controlling the electrically controllable release bolt based on the detected parking brake request comprises controlling the electrically controllable release bolt to release the parking brake spring, and wherein controlling the electrically controllable release bolt based on the detected parking brake release request comprises controlling the electrically controllable release bolt to compress the parking brake spring.

7. The computer system of claim 1, wherein controlling the electrically controllable release bolt comprises controlling an electrical motor of the parking brake actuator to drive the electrically controllable release bolt in a direction towards or from the parking brake spring based on the detected parking brake request or parking brake release request.

8. The computer system of claim 1, wherein the activation state for the electrically controllable release bolt is determined to be active when the input is indicative of the vehicle being towed and/or when the pressure status of an air-pressure supply indicates that the air pressure supplied to the parking brake actuator is below a pressure threshold.

9. A parking brake actuator comprising an electrically controllable release bolt and a parking brake spring, the electrically controllable release bolt being arranged to control or to adjust a compression state of the parking brake spring of the parking brake actuator, and wherein the parking brake actuator is arranged to be controlled by the computer system according to claim 1, and optionally wherein the electrically controllable release bolt is a power screw arranged to be controlled by an electrical motor.

10. A vehicle comprising the parking brake actuator according to claim 9.

11. A computer-implemented method for controlling an electrically controllable release bolt of a parking brake actuator of a vehicle, the electrically controllable release bolt being arranged to adjust a compression state of a parking brake spring of the parking brake actuator, wherein a resulting brake force applied by the parking brake actuator to a wheel of the vehicle is based on said compression state, the method further comprising:

by a processing circuitry of a computer system, determining an activation state for the electrically controllable release bolt based on a pressure status of an air-pressure supply of the parking brake actuator and/or based on a input, and by the processing circuitry, when the activation state indicates that the electrically controllable release bolt is active and in response to detecting a parking brake request or parking brake release request, controlling the electrically controllable release bolt to adjust the compression state of the parking brake spring based on the detected parking brake request or parking brake release request.

12. The method of claim 11 further comprising:

by the processing circuitry, obtaining an indication of a motion of the vehicle, and based on the motion of the vehicle, detecting whether a predefined hazard condition is fulfilled, and by the processing circuitry, when the activation state indicates that the electrically controllable release bolt is active, and in response to detecting that the predefined hazard condition is fulfilled, controlling the electrically controllable release bolt to release a pressure applied to the parking brake spring.

13. The method of claim 12, wherein detecting that the predefined hazard condition is fulfilled further comprises detecting that the electrically controllable release bolt is currently being controlled to compress the parking brake spring, or detecting that a time elapsed since a latest actuated parking brake release request by the parking brake actuator is below a time threshold.

14. A computer program product comprising program code for performing, when executed by the processing circuitry, the method of claim 11.

15. A non-transitory computer-readable storage medium comprising instructions, which when executed by the processing circuitry, cause the processing circuitry to perform the method of claim 11.

* * * * *